US008982358B2

(12) United States Patent
Shchegrov et al.

(10) Patent No.: US 8,982,358 B2
(45) Date of Patent: Mar. 17, 2015

(54) APPARATUS AND METHOD OF MEASURING ROUGHNESS AND OTHER PARAMETERS OF A STRUCTURE

(71) Applicant: KLA-Tencor Corporation, Milpitas, CA (US)

(72) Inventors: Andrei V. Shchegrov, Campbell, CA (US); Gregory Brady, San Jose, CA (US); Kevin Peterlinz, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 234 days.

(21) Appl. No.: 13/740,464

(22) Filed: Jan. 14, 2013

(65) Prior Publication Data

US 2013/0182263 A1 Jul. 18, 2013

Related U.S. Application Data

(60) Provisional application No. 61/587,593, filed on Jan. 17, 2012.

(51) Int. Cl.
*G01B 11/02* (2006.01)
*G01B 9/02* (2006.01)
*G01B 11/24* (2006.01)

(52) U.S. Cl.
CPC *G01B 9/02* (2013.01); *G01B 11/24* (2013.01); *G01B 2210/56* (2013.01)
USPC .......................................... 356/511

(58) Field of Classification Search
CPC .. G01B 9/02; G01B 9/02082; G01B 9/02094; G01B 9/02095; G01B 9/02096
USPC ................................ 356/511, 512
See application file for complete search history.

(56) References Cited

U.S. PATENT DOCUMENTS 6,297,880 B1 10/2001 Rosencwaig et al.
6,429,943 B1 8/2002 Opsal et al.
(Continued)

FOREIGN PATENT DOCUMENTS

RU 2223462 C2 10/2004
RU 2373494 C2 11/2009

OTHER PUBLICATIONS

International Search Report and Written Opinion mailed on Apr. 25, 2013, for PCT Application No. PCT/US2013/021866 filed on Jan. 13, 2013, by KLA-Tencor Corporation, 6 pages.

*Primary Examiner* — Jonathan Hansen
(74) *Attorney, Agent, or Firm* — Spano Law Group; Joseph S. Spano (57) ABSTRACT

Systems and methods are presented to enhance and isolate residual signals indicative of the speckle field based on measurements taken by optically based metrology systems. Structural irregularities such as roughness and topographical errors give rise to light scattered outside of the specularly reflected component of the diffracted light. The scattered light interferes constructively or destructively with the specular component in a high numerical aperture illumination and detection system to form a speckle field. Various methods of determining residual signals indicative of the speckle field are presented. Furthermore, various methods of determining structural irregularities based on analysis of the residual signals are presented. In various embodiments, illumination with a high degree of spatial coherence is provided over any of a wide range of angles of incidence, multiple polarization channels, and multiple wavelength channels. In addition, diffracted light is collected over a wide range of angles of detection.

34 Claims, 6 Drawing Sheets

(56) References Cited

U.S. PATENT DOCUMENTS

| | | |
|---|---|---|
| 6,665,131 B2 | 12/2003 | Suzuki et al. |
| 7,177,030 B2 * | 2/2007 | Leizerson et al. ............ 356/504 |
| 7,435,982 B2 | 10/2008 | Smith |
| 7,567,351 B2 | 7/2009 | Opsal et al. |
| 8,045,179 B1 | 10/2011 | Zhuang et al. |
| 8,072,611 B2 * | 12/2011 | De Groot ...................... 356/511 |
| 2009/0114816 A1 | 5/2009 | Tam et al. |
| 2011/0069312 A1 | 3/2011 | Kandel et al. |
| 2011/0310388 A1 | 12/2011 | Hill et al. |

* cited by examiner

APPARATUS AND METHOD OF MEASURING ROUGHNESS AND OTHER PARAMETERS OF A STRUCTURE

CROSS REFERENCE TO RELATED APPLICATION

The present application for patent claims priority under 35 U.S.C. §119 from U.S. provisional patent application Ser. No. 61/587,593, entitled "Apparatus and Method of Measuring Roughness and Other Parameters of a Structure," filed Jan. 17, 2012, the subject matter of which is incorporated herein by reference.

TECHNICAL FIELD

The described embodiments relate to optical metrology and inspection systems for microscopy, and more particularly to optical metrology and inspection involving speckle analysis.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

A lithographic process, as described above, is performed to selectively remove portions of a resist material overlaying the surface of a wafer, thereby exposing underlying areas of the specimen on which the resist is formed for selective processing such as etching, material deposition, implantation, and the like. Therefore, in many instances, the performance of the lithography process largely determines the characteristics (e.g., dimensions) of the structures formed on the specimen. Consequently, the trend in lithography is to design systems and components (e.g., resist materials) that are capable of forming patterns having ever smaller dimensions.

While the critical dimensions of lithographic patterning have reached nanometer scale, the roughness of the patterns has remained largely unchanged. As the impact of roughness on device performance increases, roughness metrology has been rapidly growing in importance with decreasing feature sizes in the semiconductor industry.

Figure 1:
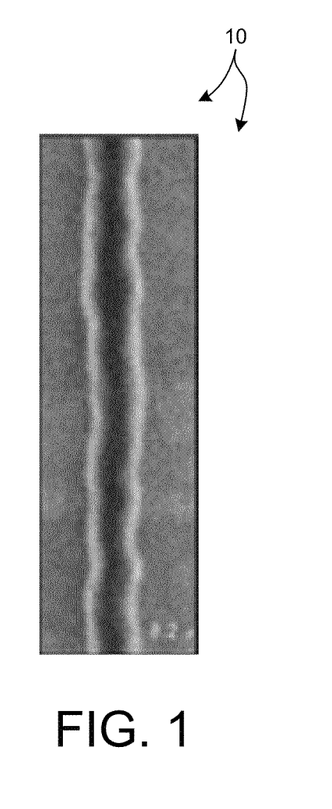
FIG. 1 illustrates a top-view, SEM image 10 of a lithographically patterned structure illustrating Line Edge Roughness (LER).

Traditional roughness measurement techniques include Scanning Electron Microscopy (SEM), Tunneling Electron Microscopy (TEM), and Atomic Force Microscopy (AFM). By way of example, FIG. 1 illustrates a top-view, SEM image 10 of a lithographically patterned structure illustrating Line Edge Roughness (LER). The image of FIG. 1 is excerpted from C. A. Mack, Field Guide to Optical Lithography, SPIE Press, Bellingham, Wash. (2006) and is currently viewable at http://spie.org/x32401.xml. Multiple implementations of SEM and associated analysis algorithms have been developed to improve roughness metrology. Exemplary implementations are discussed in U.S. Patent Application Publication 2009/0114816 entitled "Advanced Roughness Metrology" by Aviram Tam, et al., and assigned to Applied Materials, Inc. Primary disadvantages of SEM (a.k.a., CD-SEM) include limited viewing angles and a potentially destructive impact on structures under examination. This is especially undesirable in resist metrology. For the case of TEM, destructive testing of the sample is required in addition to the aforementioned disadvantages. AFM also suffers from low throughput, and in addition, offers a limited ability to characterize complex structures with sufficient probe reliability.

Inspection processes based on optical metrology are used at various steps during a semiconductor manufacturing process to detect defects on wafers to promote higher yield. Optical metrology techniques offer the potential for high throughput without the risk of sample destruction. A number of optical metrology based techniques including scatterometry implementations and associated analysis algorithms to characterize roughness have been described.

A scatterometry approach for an artificial periodic roughness is described in "Optical Fourier transform scatterometry for LER and LWR metrology," by P. Boher et al, Proc. SPIE, vol. 5752, p. 192 (2005). The description appears to lack the capability to deal with real roughness that causes light scattering outside of well-defined diffraction orders.

Effective Medium Approximations (EMA) for a region of roughness are described in "Line edge roughness detection using deep UV light scatterometry," by B. Yaakobovitz et al., Microel. Eng., vol. 84, p. 619 (2007) and "Effective medium approximations for modeling optical reflectance from gratings with rough edges," by B. Bergner et al., JOSA A, vol. 27, p. 1083 (2010). EMA algorithms are used to simulate scatterometry (e.g., reflectometry or ellipsometry) measurements by approximating roughness as an effective dielectric layer. These approaches appear to lack the flexibility required to describe the actual scattering process and cannot analyze statistical properties of random roughness.

Roughness analysis using Fourier scatterometry and spectroscopic ellipsometry is described in "Influence of line edge roughness on angular resolved and on spectroscopic scatterometry," by T. Schuster, Proc. SPIE, vol. 7155 (2008). However, the described roughness is artificially simulated with EMA algorithms or periodic roughness models that are limited in their ability to accurately describe actual scattering processes.

A modeling approach to simulate roughness effects in angle-resolved scatterometry is described in "Effect of line roughness on the diffraction intensities in angular resolved scatterometry," Appl. Opt., vol. 49. p. 6102 (2010). However, a suitable hardware implementation critical to achieving the required degree of sensitivity and throughput is not described.

U.S. Pat. No. 8,045,179 entitled "Bright and dark field scatterometry systems for line roughness metrology," issued Oct. 25, 2011, to KLA-Tencor Corporation describes a metrology tool that characterizes roughness based on the ratio of power fractions of diffusely scattered light and light diffracted into regular diffracted orders.

A dark-field LER measurement technique is described in "LER detection using dark field spectroscopic reflectometry," by B. Brill et al, Proc. SPIE, vol. 7638, 76380P (2010). However, characterizations of LER by dark-field measurements often suffer from a low signal-to-noise ratio that negatively impacts throughput and sensitivity.

In summary, SEM, TEM, and AFM techniques lack throughput and flexibility to analyze complex targets with roughness (e.g., line edge roughness, line width roughness, topography irregularities, etc.). Optical metrology techniques currently rely on artificial assumptions and/or require complex, low-sensitivity detection schemes primarily relying on the dark field signal.

As lithographic and inspection systems are pressed to higher accuracies, roughness becomes a limiting factor in maintaining device yield. Thus, improved methods and systems for characterizing roughness as well as nominal target parameters (e.g., CD, etc.) at high throughput are desired.

SUMMARY

High-throughput optical metrology and inspection systems and associated methods sensitive to structural irregularities such as roughness and topographical errors are presented. The structural irregularities give rise to light scattered outside of the specularly reflected component of the diffracted light. The scattered light interferes constructively or destructively with the specular component in a high numerical aperture illumination and detection system to form a speckle field. Various methods of determining residual signals indicative of the speckle field are presented. Furthermore, various methods of determining structural irregularities based on analysis of the residual signals are presented.

In various embodiments, illumination with a high degree of spatial coherence is provided over any of a wide range of angles of incidence, multiple polarization channels, and multiple wavelength channels. In addition, diffracted light is collected over a wide range of angles of detection.

In some embodiments, a beam profile reflectometry (BPR) system is used to perform speckle metrology on a specimen under inspection in accordance with the exemplary methods presented herein. In some embodiments, beam profile reflectometers employ one or more laser based illumination sources that provide illumination with a high degree of spatial coherence. In some other embodiments, non-laser based illumination sources may be effectively employed to generate sufficient speckle contrast. In addition, BPR systems may be configured to provide multiple angles of incidence and detection as well as multiple polarization and wavelength channels. As a result, coherent illumination generated by the BPR system may interact with the measured target at multiple angles of incidence and produce complex angle-resolved patterns.

Without roughness, these patterns may be used to measure nominal target parameters (e.g., critical dimensions (CD), film thickness, etc.). When roughness is present, a part of the incident radiation is scattered diffusely. However, due to the coherent nature of the illumination, scattered light interferes with the specular component (or components in the regular diffraction orders) and forms a speckle pattern. In a preferred embodiment, line or area scans probing different locations of a specimen are performed. In this manner, different realizations of speckle patterns are collected. In addition, these measurements are performed for different polarization and wavelength channels.

In one aspect, residual signals indicative of interference between light specularly reflected from the specimen and light diffusely scattered from the specimen are determined. In one example, a plurality of residual signals (e.g., a residual image) is determined as a difference between output signals associated with a particular pupil image and an average of a number of pupil images. The resulting residual pattern includes a random speckle pattern. In another example, a plurality of residual signals is determined as a difference between output signals associated with a particular pupil image and a best-fit model of the expected nominal structure.

In another aspect, structural irregularities are determined based at least in part on the residual signals. In some examples, statistical parameters characterizing random fluctuations of structure properties are resolved by a process (e.g., regression) that produces the best fit between a statistical model and residual signals. In one example, nominal structural parameters are estimated using data averaged over an extended area probing a statistically significant ensemble of irregularities. After the nominal structural parameters are estimated, a model of the average residual pattern including roughness parameters is fit to each of the residual patterns determined by measurement by adjusting the roughness parameters to achieve a best fit.

In other examples, roughness parameter values are determined based on a comparison between residual signals determined from measurements of the specimen and calibrated residual signals determined from measurements of a reference structure (e.g., reference wafer) with known roughness. In one example, the rms amplitudes in a residual intensity pattern are related to the rms amplitude of random roughness of the specimen in the same proportion as the rms amplitudes of calibrated residual patterns are related to the known rms amplitude of random roughness of a reference wafer.

Figure 7:
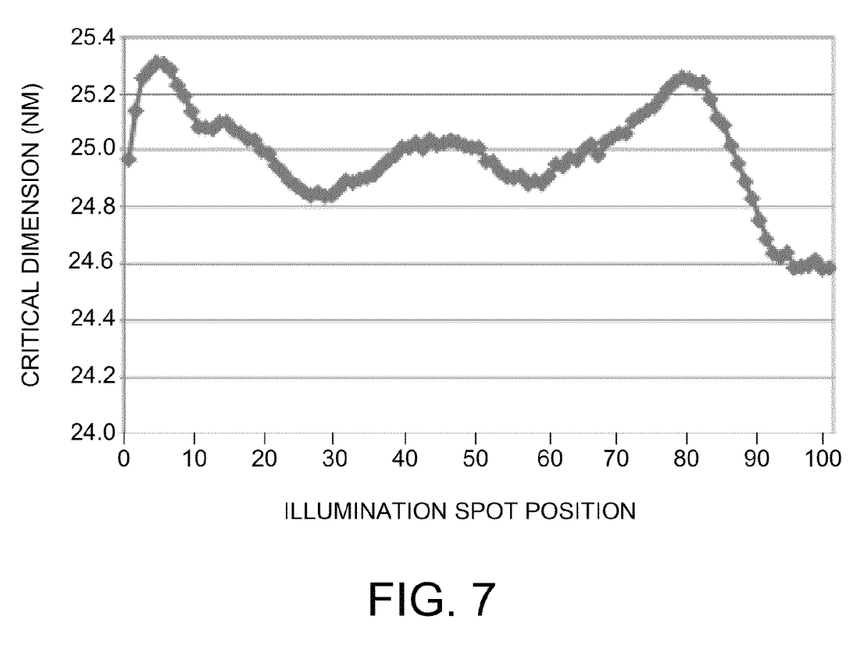
FIG. 7 is a plot illustrative of a measured critical dimension parameter value associated with different spot positions on specimen 201.

In another example, structural irregularities are resolved by first evaluating nominal structure parameters based on averaged data and then fitting other nominal structure parameters most affected by the randomness of the structural irregularity for each data set. For example, as illustrated in FIG. 7, a critical dimension parameter value determined as the best-fit to each data set associated with a different spot position on specimen 201 is plotted. As depicted, the estimated CD varies with spot position. While it is not correct to interpret the estimated CD at each point as the "local" CD tracking local roughness amplitudes, the rms amplitude of such a line scan (or area scan) provides a measure of roughness and may be used for process tracking.

In another example, structural irregularities are resolved by analyzing correlation functions for residual signals in any of the angle, wavelength, and polarization space. Residual signals associated with the diffusely scattered field may be determined as a difference between the measured intensity at a particular location of the specimen and an average intensity. Correlation functions are used to estimate parameters of the underlying amplitude or phase perturbation or surface roughness based on the residual intensity signals.

In addition to metrology, analysis of residual signals may also be employed as part of an inspection process. For example, structural irregularities may be identified based on a comparison between a residual image and a reference image. In some examples, the reference image may be an average of a number of residual images generated over a number of different locations of a specimen. In some other examples, the reference image may be a residual image associated with a reference wafer.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

In an optical metrology or inspection system dedicated to the measurement of nominal structures (e.g., CD metrology, patterned wafer inspection, etc.), detection of a speckle pattern is undesirable measurement noise that degrades the measurement signals indicative of nominal structural parameters (e.g., nominal dimensions and nominal material properties such as lateral critical dimension, feature height, sidewall angle, film thickness, index of refraction, etc). As a consequence, steps are typically taken to reduce the speckle pattern by design (e.g., reduce the degree of spatial coherence of the illumination light) or by data analysis (e.g., averaging signals to remove the effect of the speckle field). However, the inventors have discovered that the speckle field is indicative of important structural irregularities present on modern semiconductor wafers. Hence, methods and systems are presented herein to enhance and isolate residual signals indicative of the speckle field from measurements taken by optically based metrology systems and determine structural irregularities based on analysis of the residual signals.

Systems and methods for measuring structural irregularities (e.g., material inhomogeneity, dimensional characteristics of roughness, topography errors, etc.) associated with different semiconductor fabrication processes based on optical metrology are presented. In one aspect, optical metrology based on illumination with a high degree of spatial coherence is sensitive to roughness, topographic defects, or material property deviations from an ideal target structure. In various embodiments, illumination is provided over any of a wide range of angles of incidence, multiple polarization channels, and multiple wavelength channels. In addition, diffracted light is collected over a wide range of angles of detection. Structural irregularities give rise to light scattered outside of the specularly reflected component of the diffracted light. The diffusely scattered light interferes constructively or destructively with the specular component in a high numerical aperture (high-NA) illumination and detection system to form a speckle field.

The sensitivity of the optical metrology system is enhanced compared to pure bright field or dark field modalities due to the coherent interference of bright-field (unscattered) and dark-field (scattered) components of the diffracted light. A simplified expression of an electric field interacting with a specimen under inspection can be written as the sum of unperturbed and scattered components.

$$E = E^{(0)} + E^{(s)} \quad (1)$$

The unperturbed component, $E^{(0)}$, includes contributions from the specularly reflected or diffracted field (i.e., bright field) caused by interaction with well defined, specular or quasi-specular surfaces of the specimen. The scattered component, $E^{(s)}$, includes contributions from the scattered field (i.e., dark field) caused by interaction with the random component in the measured structure. The intensity of the electric field may be schematically written as the sum of contributions due to the specularly reflected or diffracted field $E^{(0)}$, an interference term, and the scattered field $E^{(s)}$.

$$I = |E^{(0)}|^2 + 2|E^{(0)}||E^{(s)}|\cos(\Phi) + |E^{(s)}|^2 \quad (2)$$

A more detailed expression requires tracking polarization and spatial and angular dependencies in the electric field. However, as written, Equation (2) illustrates the potential advantage of the proposed metrology over pure "dark field" metrology of roughness. Assume, for example, that the scale of dark-field intensity is $\sim 10^{-4}$ of the bright field intensity. In some examples, the dark field component is close to or below the noise floor of the system. As a result, the detection of structural irregularities will suffer from low sensitivity and low throughput due to increased integration time, etc. In contrast, the interference term will have $\sim 10^{-2}$ contribution from the dark field. Hence, the dark field contribution to the interference term is two orders of magnitude higher than the case of pure "dark field" metrology. As a result, detection of structural irregularities based on the coherent interference of bright-field (unscattered) and dark-field (scattered) components of the diffracted light results in increased sensitivity and throughput.

In one novel aspect, an optical metrology system is configured to detect light diffracted from the specimen under inspection and analyze the detected signals to determine residual signals indicative of structural irregularities present in the specimen. The residual signals are indicative of a speckle pattern generated by interference between light specularly reflected from the specimen and light diffusely scattered from the specimen. The residual signals are further analyzed to determine estimates of the structural irregularities.

In some embodiments, a beam profile reflectometry (BPR) system is used to perform speckle metrology on a specimen under inspection in accordance with the exemplary methods presented herein. In some embodiments, beam profile reflectometers employ one or more laser based illumination sources that provide illumination with a high degree of spatial coherence. In some other embodiments, non-laser based illumination sources may be effectively employed to generate sufficient speckle contrast. In addition, BPR systems may be configured to provide multiple angles of incidence and detection as well as multiple polarization and wavelength channels. As a result, coherent illumination generated by the BPR system may interact with the measured target at multiple angles of incidence and produce complex angle-resolved patterns. Without roughness, these patterns may be used to measure nominal target parameters (e.g., critical dimensions (CD), film thickness, etc.). When roughness is present, a part of the incident radiation is scattered diffusely. However, due to the coherent nature of the illumination, scattered light interferes with the specular component (or components in the regular diffraction orders) and forms a speckle pattern. Illumination and detection at multiple angles increases throughput and increases sensitivity by increasing the range of bright field and dark field components that interfere with each other to form the speckle pattern.

Figure 2:
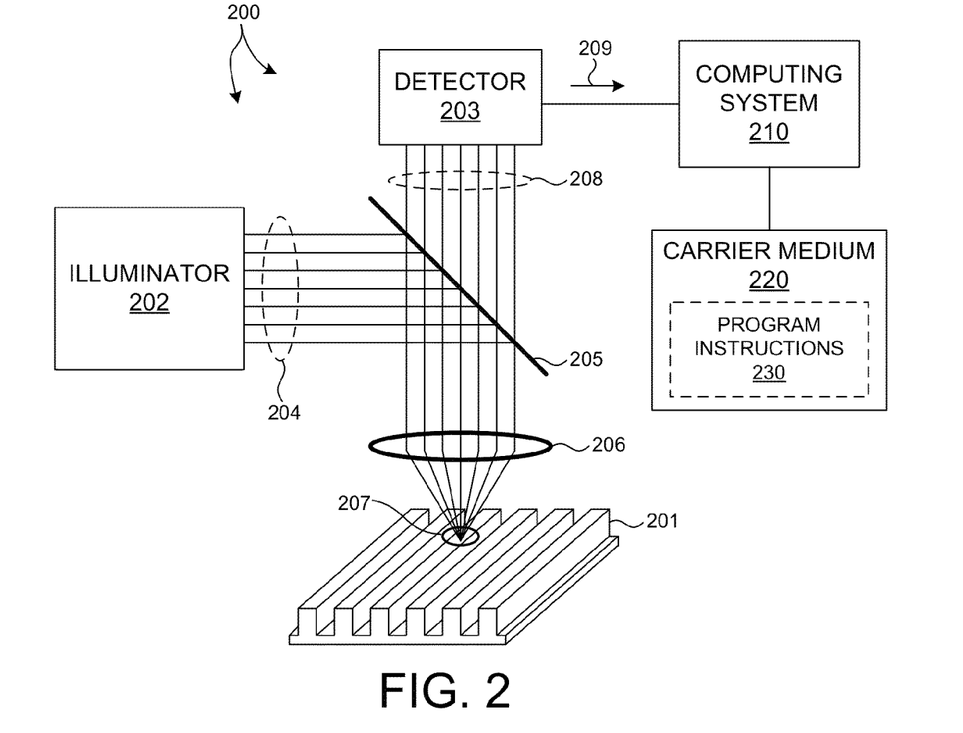
FIG. 2 is a diagram of illustrative of a two-dimensional beam profile reflectometer 200 in one embodiment.

FIG. 2 illustrates a highly simplified schematic view of a two-dimensional BPR 200 configured to detect light diffracted from a specimen under inspection and analyze the detected signals to determine residual signals indicative of structural irregularities. The BPR 200 is further configured to analyze the residual signals to determine estimates of the structural irregularities in accordance with the methods presented herein.

BPR 200 includes an illuminator 202 that delivers an illumination light 204 having a high degree of spatial coherence. The degree of spatial coherence of illumination light 204 is selected such that a detectable speckle pattern is generated based on interference between light specularly reflected from the specimen and light diffusely scattered from the specimen. Illumination light 204 is directed toward a high-NA objective lens 206 by beam splitter 205. In a preferred embodiment, objective lens 206 has a numerical aperture of approximately 0.9. However, in some other embodiments, objective lens 206 may have a NA less than 0.9. In yet some other embodiments, objective lens 206 may have a NA greater than 0.9. For example, an objective lens 206 operating in an immersion system may have a NA greater than 0.9. Objective lens 206 simultaneously illuminates specimen 201 over an illumination area (i.e., illumination spot) 207 and collects diffracted light from specimen 201 over a wide range of angles. Field stops and apodizers (not shown) may be used to control spatial properties of illumination and collection beams. The collected light 208 is directed to detector 203 via beam splitter 205. In the depicted embodiment, detector 203 is a two dimensional array of charge coupled devices (CCD). Detector 203 detects collected light 208 and generates output signals 209 indicative of a pupil image of illumination area 207.

In some embodiments, illumination light 204 includes several wavelength channels. For example, illumination light 204 may be provided by multiple, different lasers. In some embodiments, BPR 200 includes different optical channels having different polarization and a waveplate to collect and measure relative phase difference between polarizations (not shown). In some embodiments, illuminator 202 is configured to provide multiple wavelengths simultaneously (e.g., a super-continuum laser source, a lamp source, or a laser-driven light source such as a laser sustained plasma).

In a further embodiment, the BPR 200 includes one or more computing systems 210 employed to analyze the output signals 209 to determine residual signals indicative of structural irregularities. Computing system 210 is further configured to analyze the residual signals to determine estimates of the structural irregularities in accordance with the methods presented herein. The one or more computing systems 210 may be communicatively coupled to the detector 203. The one or more computing systems 210 are configured to receive the output signals 209 generated by detector 203.

It should be recognized that the various steps described throughout the present disclosure may be carried out by a single computer system 210 or, alternatively, a multiple computer system 210. Moreover, different subsystems of the system 200, such as the detector 203, may include a computer system suitable for carrying out at least a portion of the steps described herein. Therefore, the description presented herein should not be interpreted as a limitation on the present invention but merely an illustration. Further, the one or more computing systems 210 may be configured to perform any other step(s) of any of the method examples described herein.

In another embodiment, the computer system 210 may be communicatively coupled to the detector 203 in any manner known in the art. For example, the one or more computing systems 210 may be coupled to a computing system of the detector 203. In another example, the detector 203 and the illuminator 202 may be controlled by a single computer system. In this manner, the computer system 210 may be coupled to the single computer system.

The computer system 210 may be configured to receive and/or acquire data or information from the subsystems of the system (e.g., detector 203, illuminator 202, and the like) by a transmission medium that may include wireline and/or wireless portions. In this manner, the transmission medium may serve as a data link between the computer system 210 and other subsystems of BPR 200. Further, the computing system 210 may be configured to receive images or residual signals via a storage medium (i.e., memory). For instance, the output signals 209 generated by detector 203 may be stored in a permanent or semi-permanent memory device (e.g., carrier medium 220). In this regard, the output signals may be imported from an external system.

Moreover, the computer system 210 may send data to external systems via a transmission medium. The transmission medium may include wireline and/or wireless portions. In this manner, the transmission medium may serve as a data link between the computer system 210 and other subsystems of BPR 200 or external systems. For example, computer system 210 may send results generated by computer system 210 to external systems or to other subsystems of BPR 200 via a transmission medium.

The computing system 210 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 230 implementing methods such as those described herein may be transmitted over or stored on carrier medium 220. The carrier medium may be a transmission medium such as a wire, cable, or wireless transmission link. The carrier medium may also include a computer-readable medium such as a read-only memory, a random access memory, a magnetic or optical disk, or a magnetic tape.

Figure 6:
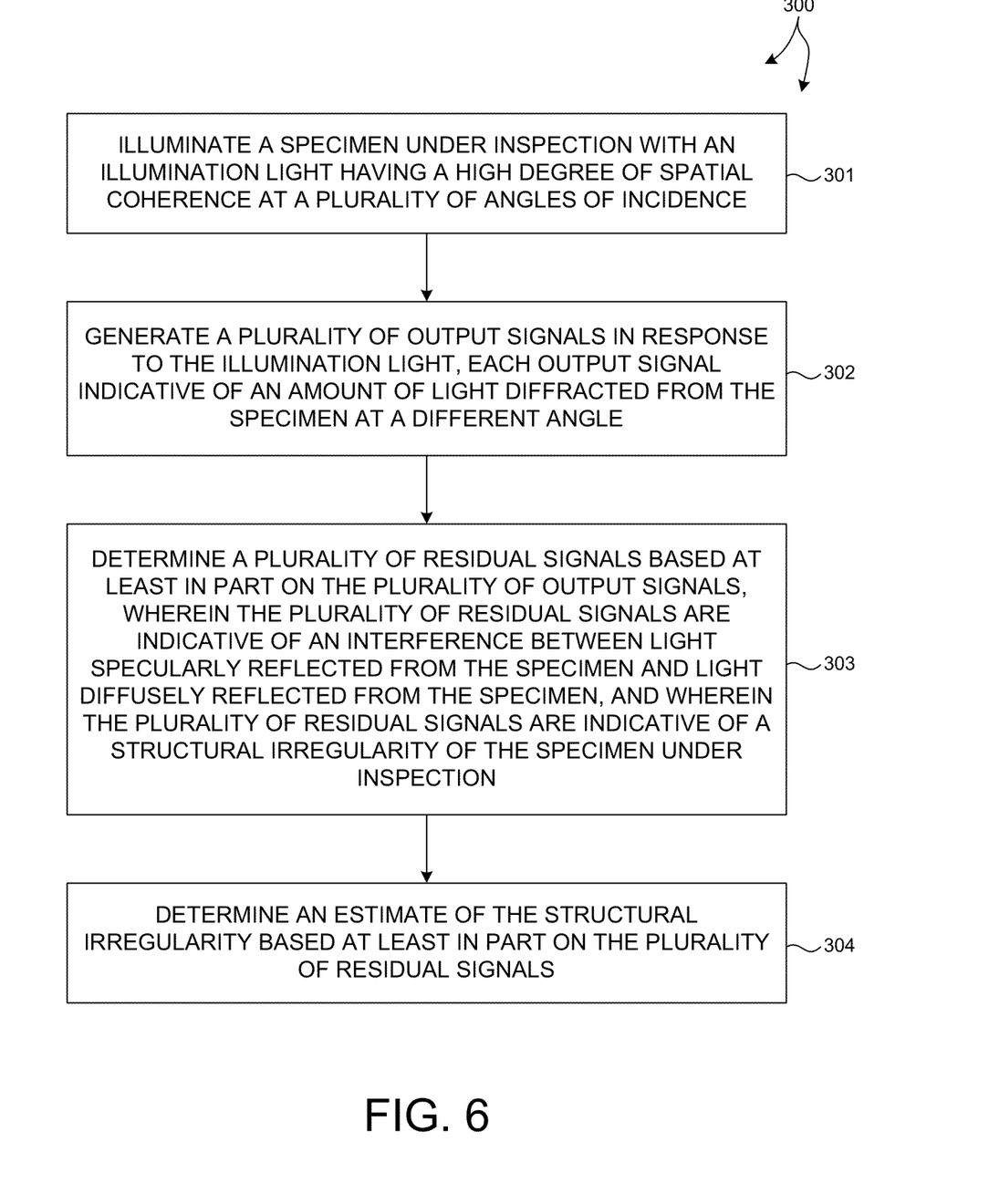
FIG. 6 is a flowchart illustrative of one exemplary method 300 for isolating residual signals indicative of the speckle field from measurements taken by optically based metrology systems and determine structural irregularities based on analysis of the residual signals.

FIG. 6 illustrates a method 300 suitable for implementation by BPR 200 of the present invention. In one aspect, it is recognized that data processing blocks of method 300 may be carried out via a pre-programmed algorithm stored as part of program instructions 230 and executed by one or more processors of computing system 210. While the following description is presented in the context of BPR 200 depicted in FIG. 2, it is recognized herein that the particular structural aspects of BPR 200 do not represent limitations and should be interpreted as illustrative only.

In block 301, spatially coherent illumination light 204 illuminates specimen 201 under inspection over a range of angles of incidence. In some embodiments, the effective illumination area 207 (i.e., area from which diffracted light is used for metrology or inspection) is less than one hundred micrometers squared. In some embodiments, the effective inspection area 207 is less than four micrometers squared. In some embodiments, the effective inspection area 207 is less than one micrometer squared, for example, in a diffraction limited metrology scenario. In this manner, high-NA BPR systems have the ability to perform measurements over a small area (e.g., within a single die).

As discussed hereinbefore, in a preferred embodiment objective lens 206 has a high numerical aperture (e.g., NA of approximately 0.9). In this manner, spatially coherent illumination light 204 illuminates specimen 201 over a wide range of angles of incidence (e.g., a range of angles between zero and sixty four degrees for a system operating in air).

Spatially coherent illumination light 204 has a degree of coherence sufficiently high to generate a detectable speckle pattern based on an interference between light specularly reflected from the specimen and light diffusely scattered from the specimen. In some embodiments, illuminator 202 is a laser light source. In some other embodiments, illuminator 202 is a high-brightness lamp source (e.g. laser-driven plasma light source) that is partially spatially coherent. The spatial coherence properties of illumination light 204 may be engineered, for example, by selecting light sources, single or multi-mode fibers, diffusers, scanning mirrors, and piezo stages, etc. Partially coherent illumination results in partially developed speckle patterns that are used to evaluate roughness parameters. Partially coherent illumination may provide a more robust measurement of nominal structural parameters without undue speckle suppression.

In some embodiments, in addition to illuminating specimen 201 over a range of angle of incidence, specimen 201 is illuminated at a number of different locations of specimen 201. In these embodiments, specimen 201 may be positioned under objective 206 by a wafer positioning system (not shown). For example, wafer positioning system may be a x-y translation stage or a rotary stage known in the art. Alternatively, or in conjunction with a wafer positioning system, illumination light 204 may be directed to different locations on specimen 201 by redirecting the illumination light 204. For example, a scanning mirror may be employed to redirect illumination light 204 to different locations on specimen 201.

In some embodiments, in addition to illuminating specimen 201 over a range of angle of incidence, specimen 201 is illuminated by an illumination light 204 having a number of different wavelengths. Also, in some embodiments, in addition to illuminating specimen 201 over a range of angle of incidence, specimen 201 is illuminated by an illumination light 204 having a number of different polarization angles.

Figure 3:
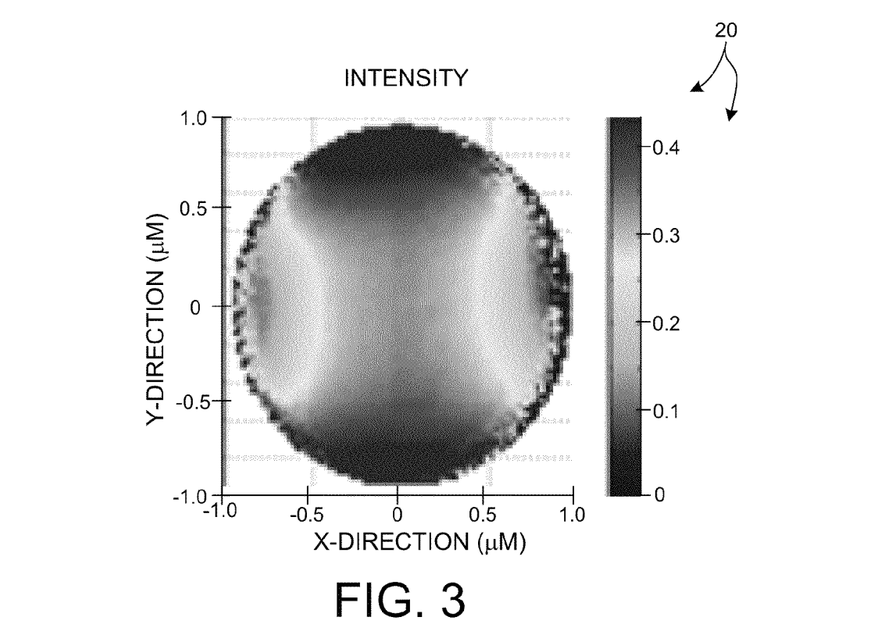
FIG. 3 illustrates a plot 20 of intensity of collected light at one wavelength and at one polarization channel resolved in the angular domain measured by a beam profile reflectometer.
Figure 4:
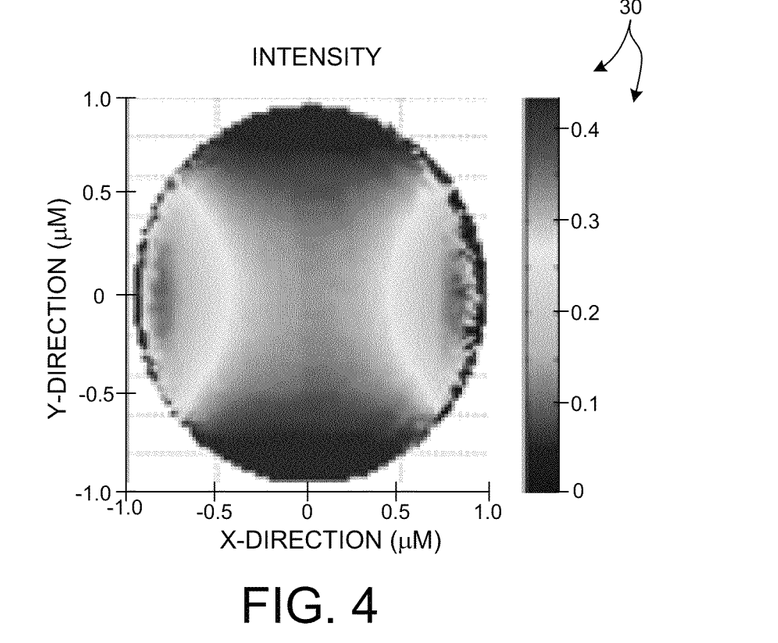
FIG. 4 illustrates a plot 30 of average intensity of collected light at one wavelength and at one polarization channel resolved in the angular domain over a line of several microns measured by a beam profile reflectometer.
Figure 5:
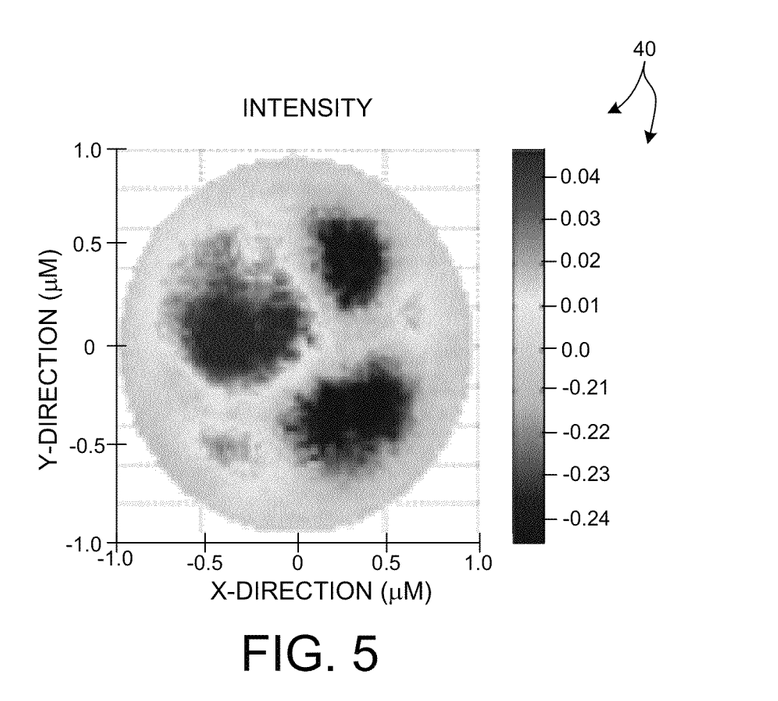
FIG. 5 illustrates a plot 40 of a residual difference between the pupil image collected at a given spot illustrated in FIG. 3, and the average intensity pattern measured over multiple spots as illustrated in FIG. 4.

In block 302, detector 203 generates a plurality of output signals 209, each indicative of an amount of light diffracted from the specimen 201 at a different angle. In some embodiments, detector 203 includes a two dimensional array of CCD elements. In some other embodiments, detector 203 includes a one dimensional array of CCD elements. Other detector elements may be contemplated (e.g., photodetectors, etc.). Hence, in general, BPR may be one dimensional (e.g., employing a one dimensional array of photodiodes) or two dimensional (e.g., employing a two dimensional CCD array). The pupil images illustrated in FIGS. 3-5 are generated by a two dimensional BPR system. In some embodiments, the plurality of output signals is assembled to generate an image of specimen 201 at the pupil plane. FIG. 3 illustrates a plot 20 of intensity of collected light at one wavelength and at one polarization channel resolved in the angular domain. This pupil image illustrates pupil data collected over inspection area 207 having a spot size of two microns by two microns.

In block 303, computer system 210 determines a plurality of residual signals based at least in part on the output signals 209. The residual signals are indicative of interference between light specularly reflected from the specimen 201 and light diffusely scattered from specimen 201. As discussed herein, the residual signals are indicative of structural irregularities of the specimen 201.

The nominal scatterometry measurement process consists of parameterization of the structure (e.g., film thicknesses, critical dimensions, etc.) and the system (e.g., wavelengths, angles of incidence, polarization angles, etc.). Certain parameters are treated as known, fixed parameters and other parameters are treated as unknown, floating parameters. The floating parameters are resolved by a process (e.g., regression) that produces the best fit between theoretical predictions and experimental data.

In many applications, nominal structures of interest are designed as periodic gratings. Structural irregularities, such as roughness, manifest themselves as irregular patterns in the pupil images that cannot be reproduced by modeling ideal targets. For purposes of measurement of nominal structures, these irregularities are reduced by spatially averaging over different locations of specimen 201. For example, one dimensional scans (i.e., line scans) or two dimensional (i.e., area scans) may be performed and the resulting output signals 209 averaged to generate an average pupil image. FIG. 4 illustrates a plot 30 of average intensity of collected light at one wavelength and at one polarization channel resolved in the angular domain over a line of several microns. As illustrated, plot 30 exhibits higher degree of symmetry compared with plot 20 of FIG. 3. From an average pupil image, such as illustrated in FIG. 4, nominal structural parameters (e.g., critical dimensions) may be estimated more accurately than from a pupil image collected over one location of specimen 201.

In one example, computer system 210 determines a plurality of residual signals (e.g., a residual image) by determining a difference between output signals associated with a particular pupil image and an average of a number of pupil images. FIG. 5 illustrates a plot 40 of the residual difference between the pupil image collected on a given spot on the structure illustrated in FIG. 3, and the pattern averaged over multiple spots (e.g., via line or area scan averaging over several spots illustrated in FIG. 4. As depicted in FIG. 5, the residual pattern is a random speckle pattern. The inventors have discovered that residual patterns are different for different measured areas of specimen 102. Moreover, the residual patterns are repeatable, i.e., measuring the same spot results in the same residual pattern.

In a preferred embodiment, line or area scans probing different locations of specimen 201 are performed. In this manner, different realizations of residual patterns, such as the residual pattern illustrated in FIG. 5, are collected. In addition, these measurements are performed for different polarization and wavelength channels.

In other embodiments, illumination numerical aperture and spot size are designed to obtain a larger number of speckle spots in the analyzed pupil. In this manner, speckle statistics can be analyzed within one pupil realization.

In another example, computer system 210 determines a plurality of residual signals (e.g., a residual image) by determining a difference between output signals associated with a particular pupil image and a model of the expected nominal structure. As discussed hereinbefore, nominal parameter values may be resolved by a process (e.g., regression) that produces the best fit between theoretical predictions and experimental data over a number of locations on specimen 201. In this manner, residual images are determined based on differences between measured pupil images and a best fit model of the expected nominal structure.

In block 304, computer system 210 determines an estimate of the structural irregularity of specimen 201 based at least in part on the residual signals.

In some examples, computer system 210 resolves statistical parameters characterizing random fluctuations of structure properties by a process (e.g., regression) that produces the best fit between a statistical model and residual signals. In one example, computer system 210 estimates nominal structural parameters using data averaged over an extended area probing a statistically significant ensemble of irregularities. This can be accomplished by scanning a small spot (e.g. ~1 micron in size) over a larger area (e.g., several microns in size), by using a larger illumination spot (e.g. several microns or tens of microns in size), or both. After the nominal structural parameters are estimated, a model of the average residual pattern including parameters characterizing a structural irregularity (e.g., roughness) is fit to each of the residual patterns determined by measurement by adjusting the roughness parameters to achieve a best fit.

In some examples, the correlation length of surface roughness (or other structural irregularities) is relatively large compared to available illumination wavelengths. In these examples, for zero-mean roughness, the root mean squared (rms) fluctuations of intensity illustrated in FIG. 5 will increase with roughness rms amplitude (or rms amplitude of other perturbations). Similarly, it is known that the scattered field angular distribution will include a term directly proportional to the power spectral density of surface roughness when the roughness correlation length is relatively large compared to the illumination wavelength. In this manner, the power spectral density of surface roughness is determined based on the angle dependence of residuals in the pupil. In some embodiments, illumination properties (e.g., NA and spot size) may be optimized to measure the power spectral density over a certain spatial frequency range. In addition, decay of residual signals with spatial averaging (e.g., via line or area scans) may also be analyzed to determine if the residual signals are caused by random (statistical) sources or deterministic sources.

In other examples, computer system 210 determines roughness parameter values based on a comparison between residual signals determined from measurements of specimen 201 and calibrated residual signals determined from measurements of a reference structure (e.g., reference wafer) with known roughness. In this manner, residual signals determined from measurements of specimen 201 are quickly analyzed without the need to generate offline libraries for floating nominal parameters. In one example, the rms amplitudes in the residual pattern of FIG. 5 are related to the rms amplitude of random roughness of specimen 201 in the same proportion as the rms amplitudes of calibrated residual patterns are related to the known rms amplitude of random roughness of a reference wafer.

In another example, computer system 210 resolves structural irregularities by first evaluating nominal structure parameters based on averaged data and then fitting other nominal structure parameters most affected by the randomness of the structural irregularity for each data set. For example, as illustrated in FIG. 7, a critical dimension parameter value determined as the best-fit to each data set associated with a different spot position on specimen 201 is plotted. As depicted, the estimated CD varies with spot position. While it is not correct to interpret the estimated CD at each point as the "local" CD tracking local roughness amplitudes, the rms amplitude of such a line scan (or area scan) provides a measure of roughness and may be used for process tracking.

In another example, computer system 210 resolves structural irregularities by analyzing correlation functions for residual signals in the angle, wavelength, and polarization space. Residual signals associated with the diffusely scattered field may be determined as a difference between the measured intensity at a particular location of specimen 201 and an average intensity, $$\Delta I(\theta_x, \theta_y; \lambda) = I(\theta_x, \theta_y; \lambda) - \langle I(\theta_x, \theta_y; \lambda) \rangle \quad (3)$$

where θx and θy are the angles of observation (or pupil image angular coordinates) and λ is the illumination wavelength. Averaging (indicated by the angle brackets) in the spatial domain is achieved by line and/or area and/or focus scans. In addition, or instead, the averaging may be performed in the angular domain if the number of speckle spots is large. The residual intensity signals are also polarization dependent (the polarization indices are not included for brevity). Although the polarization state is not indicated in Equation (3), it is assumed that co-polarized or cross-polarized channels may be used in either polarization.

Correlation functions of the form $$\langle \Delta I(\theta_x^{(1)}, \theta_y^{(1)}; \lambda^{(1)}) \Delta I(\theta_x^{(2)}, \theta_y^{(2)}; \lambda^{(2)}) \rangle \quad (4)$$

may be used to estimate parameters of the underlying amplitude or phase perturbation or surface roughness based on the residual intensity signals as known in the art.

In addition to metrology, analysis of residual signals may also be employed as part of an inspection process. For example, structural irregularities may be identified based on a comparison between a residual image and a reference image. In some examples, the reference image may be an average of a number of residual images generated over a number of different locations of a specimen. In some other examples, the reference image may be a residual image associated with a reference wafer. The comparison between the residual image and the reference image, or reference images, may involve any number of comparison techniques known in the art.

Although the methods discussed hereinbefore are explained with reference to beam profile reflectometer 200, any optical metrology system configured to illuminate and detect spatially coherent light diffracted from a specimen under inspection over a wide range of angles may be employed to implement the exemplary methods described herein. Examples include an angle-resolved reflectometer (or scatterometer), a reflectometer or ellipsometer having at least a partially coherent illumination source, etc.

Various implementations of suitable BPR systems are illustrated in U.S. Pat. No. 6,429,943 to Opsal et al., U.S. Pat. No. 6,665,131 to Opsal et al., U.S. Pat. No. 6,297,880 to Rosencwaig et al., U.S. Pat. No. 7,567,351 to Opsal et al., U.S. Pat. Publication No. 2011/0310388 A1 by Hill et al., and U.S. Pat. Publication No. 2011/0069312 by Kandel et al., which are incorporated by reference as if fully set forth herein.

Figure 8:
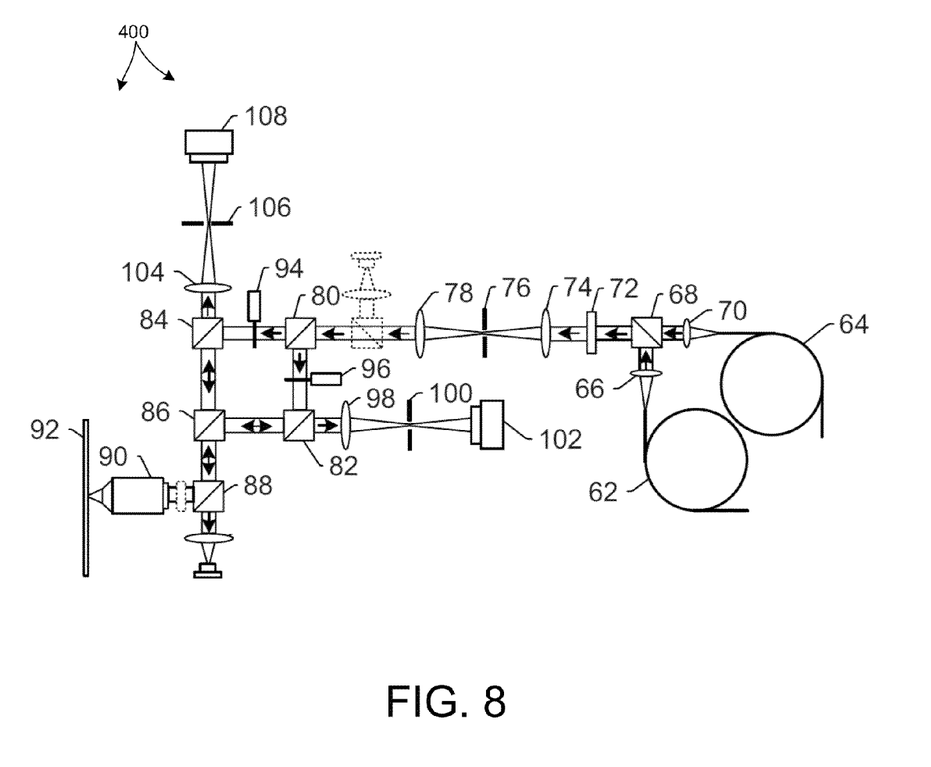
FIG. 8 is a diagram illustrative of a two-dimensional beam profile reflectometer 400 in another embodiment.

A preferred embodiment of a suitable BPR system is illustrated in FIG. 8, and is more fully described in U.S. Pat. Publication No. 2011/0310388 A1. FIG. 8 illustrates a path-based parallel discrete polarization scatterometer 400 in one exemplary embodiment. Use of the term "parallel" in this context refers to a system that acquires a subset of polarization permutations by the use of, for example, a PBS in the collection path of the instrument, which allows at least two polarization states to be collected simultaneously on different collection channels. In the depicted embodiment, the detection subsystem is configured to separately detect the two different scattered light beams simultaneously. For example, in one embodiment described further herein, the detection subsystem is configured to direct the two different scattered light beams to two different detectors simultaneously.

As shown in FIG. 8, the optical subsystem includes two optical fibers 62 and 64. Each of the optical fibers may be coupled to a light source (not shown in FIG. 8) that is configured to provide light having a different polarization. For example, optical fiber 62 may be coupled to a first light source (not shown in FIG. 8) configured to provide light having a first polarization, and optical fiber 64 may be coupled to a second light source (not shown in FIG. 8) configured to provide light having a second polarization that is orthogonal to and mutually exclusive of the first polarization. In this manner, light exiting the two optical fibers may have orthogonal and mutually exclusive polarizations. Light from fiber 62 may be imaged by refractive optical element 66 to polarizing beam splitter (PBS) 68. In addition, light from fiber 64 may be imaged by refractive optical element 70 to PBS 68. PBS 68 is configured to reflect light from fiber 62 and transmit light from fiber 64 such that light having both polarizations is directed along a common optical path.

Light from PBS 68 may be directed to apodizer 72. Light from apodizer 72 may be directed to refractive optical element 74, which focuses the light through illumination field stop (IFS) 76. Light that passes through IFS 76 may be imaged by refractive optical element 78 to PBS 80. PBS 80 is configured to separate the light into two different light beams having orthogonal and mutually exclusive polarizations. For example, light having one polarization is reflected by PBS 80 to non-PBS 82, while light having an orthogonal and mutually exclusive polarization is transmitted by PBS 80 to non-PBS 84.

Non-PBS's 82 and 84 reflect the light from PBS 80 to PBS 86, which directs the light beams to non-PBS 88. Non-PBS 88 reflects the light from PBS 86 to objective 90, which focuses the light to wafer 92. In this embodiment, therefore, the two or more first optical elements that are configured to direct the two different light beams to a wafer include non-PBS's 82, 84, and 88 and PBS 86.

Shutters 94 and 96 are configured to control which one of the two different light beams illuminates the wafer during the measurements. In particular, when light reflected by PBS 80 is to be used for measurements, shutter 94 may be positioned in the optical path between PBS 80 and non-PBS 84, and when light transmitted by PBS 80 is to be used for measurements, shutter 96 may be positioned in the optical path between PBS 80 and non-PBS 82.

Light scattered from the wafer is collected by objective 90 and is directed to non-PBS 88, which reflects the light to PBS 86. PBS 86 separates the light into two different scattered light beams having orthogonal and mutually exclusive polarizations. The scattered light beam reflected by PBS 86 is directed through non-PBS 82 and is focused by refractive optical element 98 through collection field stop (CFS) 100. Light that passes through CFS 100 is detected by detector 102 of the detection subsystem. The scattered light beam transmitted by PBS 86 is directed through non-PBS 84 and is focused by refractive optical element 104 through CFS 106. Light that passes through CFS 106 is detected by detector 108 of the detection subsystem. The detectors may be charge coupled devices (CCDs). In this manner, scattered light beams having orthogonal and mutually exclusive polarizations may be separated by common PBS 86 and directed to different detectors, which may separately detect the different scattered light beams simultaneously. Each of the elements of the optical subsystem shown in FIG. 8 may include any suitable optical elements.

The inventors have discovered that the characteristics of the speckle pattern produced by a rough sample are greatly affected by the illumination distribution present in the pupil of the system. Varying the illumination distribution changes the size and shape of the spot incident on the structure being measured.

Within the Fourier optics formalism, the pupil plane may be regarded as the Fourier transform plane. The exemplary methods described herein rely on the coherent mixing of the specular and scattered reflection components from the wafer. The spatial frequency content of the specular component is largely determined by the input illumination distribution. Adjusting the illumination distribution results in mixing with different scattered spatial frequencies. Thus the choice of illumination distribution may emphasize (or deemphasize) certain characteristics of the roughness being characterized. In one example, the appropriate numerical aperture (NA) of the system should be selected. In general, the larger the NA, the smaller the achievable illumination spot. However, more complex apodized illumination distributions can be used to emphasize certain spatial frequencies of the roughness being measured. This may also be used to compensate for the statistical spatial frequency content (e.g., power spectral density) of the roughness. For example, if the PSD of the roughness is approximately known, illuminating with a particular apodization combined with averaging can be used to confirm or falsify that assumption. While a static apodized illumination distribution is useful, active variation of the distribution may be desirable. In this manner, the configuration may be tailored to particular structures being measured. In another example, multiple measurements under different illumination distributions may be used to characterize the roughness. Possible methods of varying the illumination might include a simple iris diaphragm, or more complicated spatial light modulators based on liquid crystal or micro-electro-mechanical systems (MEMS) technologies.

In some embodiments, any of a spatial light modulator placed conjugate to the illumination pupil plane, a spatial light modulator placed conjugate to sample image plane, a selectable illumination pupil aperture, a rotating illumination apodizer, a selectable illumination apodizer, a selectable illumination field stop, and multiple sample focus positions may be used to systematically vary the illumination spatial function to provide data which may be used to separate the contributions from the specular and diffusely scattered components.

Selection of an appropriate wavelength and polarization channel maximizes sensitivity to roughness or other structural irregularities. In general, shorter wavelengths scatter more strongly from roughness than longer wavelengths. However, in some examples, particular wavelengths that induce resonant coupling into structure optical eigenmodes are preferable to the shortest achievable wavelength.

The exemplary methods described herein rely on coherent mixing of the specular component and the scattered component of light diffracted from the surface of a specimen under inspection. As described hereinbefore, the illumination distribution in the pupil defines the sensitivity associated with various spatial frequency components. If a low numerical aperture or other illumination distribution illuminating only a small portion of the pupil plane is used, spatial frequencies of interest will not coherently mix with the specular component, and significant information describing the roughness that falls in this dark field region will be lost. However, in some embodiments, a portion of the illumination beam is split from the main optical path and redirected to illuminate the detector plane, as is commonly done in holography, interferometry, and other heterodyne detection schemes. The dim speckles falling in the otherwise dark field will mix with this new illumination beam (which never interacts with the sample)

allowing an increase in sensitivity to spatial frequencies with information about the sample roughness. In the extreme case of a rough surface with no specular component, the detected intensity distribution would be a Fourier transform hologram of the surface and the topography could be reconstructed numerically using known methods.

Some of the exemplary methods described herein attempts to account for a mismatch between an idealized electromagnetic diffraction model of the structure being measured and the real data measured on the metrology tool. An underlying assumption is that randomly varying roughness or other types of structural irregularity (e.g. doping variations) is the cause of this mismatch. The expectation is that the roughness is described by particular correlation functions (e.g., a Gaussian correlation function) that may be parameterized by a particular spatial correlation length, and the residuals representing this mismatch from two separate measurements made at a point separated by substantially more than this length should be entirely uncorrelated. However, the residuals may have terms which remain correlated over a large ensemble of spatially separated measurements. This represents a systematic error that should be calibrated out of the measurement. In this manner, the exemplary methods described herein offer the opportunity to separate random variations (e.g., due to roughness or other sources) and correlated errors.

Various embodiments are described herein for a semiconductor processing system (e.g., an inspection system or a lithography system) that may be used for processing a specimen. The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as quartz. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of in or data structures and that can be accessed by a general-purpose or special-purpose computer, or a general-purpose or special-purpose processor. Also any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
    illuminating a specimen under inspection with an illumination light having a high degree of spatial coherence at a plurality of angles of incidence;
    generating a plurality of output signals in response to the illumination light, each output signal indicative of an amount of light diffracted from the specimen at a different angle;
    determining a plurality of residual signals based on the plurality of output signals, wherein the plurality of residual signals are indicative of an interference between light specularly reflected from the specimen and light diffusely scattered from the specimen, and wherein the plurality of residual signals are indicative of a structural irregularity of the specimen under inspection; and
    determining an estimate of the structural irregularity based on the plurality of residual signals.

2. The method of claim 1, wherein the illumination light has a degree of coherence sufficiently high to generate a detectable speckle pattern based on the interference between light specularly reflected from the specimen and light diffusely scattered from the specimen.

3. The method of claim 1, further comprising:
    generating a pupil image based on the plurality of output signals; and
    generating a residual image based on the plurality of residual signals.

4. The method of claim 3, wherein the generating of the residual image involves determining a difference between the pupil image and an average of a plurality of pupil images generated over a plurality of different locations of the specimen.

5. The method of claim 3, wherein the generating of the residual image involves determining a difference between the pupil image and a best fit model of the pupil image, the best fit model of the pupil image determined from a plurality of pupil images generated over a plurality of different locations of the specimen.

6. The method of claim 1, wherein the determining of the estimate of the structural irregularity involves fitting a model of an average residual pattern to the plurality of residual signals.

7. The method of claim 1, wherein the determining the estimate of the structural irregularity involves determining a plurality of calibrated residual signals based on measurements of a specimen with a known structural irregularity.

8. The method of claim 1, wherein the determining the estimate of the structural irregularity involves determining a plurality of nominal structure parameter values each corresponding to a best fit of a model of each of a plurality of residual patterns over a plurality of different locations of the specimen and determining the estimate of the structural irregularity based at least in part on the plurality of nominal structure parameter values.

9. The method of claim 1, wherein the structural irregularity is any of a roughness parameter, a topographic defect, and a material property.

10. The method of claim 3, further comprising:
generating an average pupil image based on an average of a plurality of pupil images generated over a plurality of different locations of the specimen; and
determining a nominal structural parameter of the specimen based on the average pupil image.

11. The method of claim 3, wherein the determining an estimate of the structural irregularity involves comparing the residual image with a reference image.

12. The method of claim 11, wherein the reference image is an image generated by averaging a plurality of residual images generated over a plurality of different locations of the specimen.

13. The method of claim 1, wherein the determining of the plurality of residual signals involves determining a difference between the plurality of output signals and an average of the plurality of output signals over a plurality of different locations on the specimen, and wherein the determining of the estimate of the structural irregularity involves determining a plurality of correlation functions among the plurality of residual signals, wherein the plurality of residual signals are determined over any of a plurality of different locations on the specimen, a plurality of angles of incidence, a plurality of illumination wavelengths, and a plurality of polarization angles.

14. The method of claim 1, wherein an illumination area over which the illumination light effectively illuminates the specimen under inspection is less than one hundred micrometers squared.

15. An apparatus comprising:
an illumination source operable to generate an amount of illumination light having a high degree of spatial coherence;
an optical element operable to receive the amount of illumination light from the illumination source and focus the amount of light on a specimen under inspection at a plurality of angles of incidence;
an array of detectors operable to generate a plurality of output signals in response to the illumination light, each output signal indicative of an amount of light diffracted from the specimen at a different angle; and
a computer configured to determine a plurality of residual signals based on the plurality of output signals, wherein the plurality of residual signals are indicative of an interference between light specularly reflected from the specimen and light diffusely scattered from the specimen and determine an estimate of a structural irregularity of the specimen based on the plurality of residual signals.

16. The apparatus of claim 15, wherein the illumination light has a degree of coherence sufficiently high to generate a detectable speckle pattern based on an interference between light specularly reflected from the specimen and light diffusely scattered from the specimen.

17. The apparatus of claim 15, wherein the computer is further configured to generate a pupil image based on the plurality of output signals, and generate a residual image based on the plurality of residual signals.

18. The apparatus of claim 17, wherein the generating of the residual image involves determining a difference between the pupil image and an average of a plurality of pupil images generated over a plurality of different locations of the specimen.

19. The apparatus of claim 17, wherein the generating of the residual image involves determining a difference between the pupil image and a best fit model of the pupil image, the best fit model of the pupil image determined from a plurality of pupil images generated over a plurality of different locations of the specimen.

20. The apparatus of claim 15, wherein the determining of the estimate of the structural irregularity involves fitting a model of an average residual pattern to the plurality of residual signals.

21. The apparatus of claim 15, wherein the determining of the estimate of the structural irregularity involves determining a plurality of calibrated residual signals based on measurements of a specimen with a known structural irregularity.

22. The apparatus of claim 15, wherein the determining the estimate of the structural irregularity involves determining a plurality of nominal structure parameter values each corresponding to a best fit of a model of each of a plurality of residual patterns over a plurality of different locations of the specimen and determining the estimate of the structural irregularity based at least in part on the plurality of nominal structure parameter values.

23. The apparatus of claim 17, wherein the determining an estimate of the structural irregularity involves comparing the residual image with a reference image.

24. The apparatus of claim 23, wherein the reference image is an image generated by averaging a plurality of residual images generated over a plurality of different locations of the specimen.

25. An apparatus comprising:
a processor; and
a non-transitory, computer-readable medium storing instructions that, when executed by the processor, cause the apparatus to:
receive a plurality of output signals in response to an illumination of a specimen under inspection at a plurality of angles of incidence by an illumination light having a high degree of spatial coherence, each output signal indicative of an amount of light diffracted from the specimen at a different angle;
determine a plurality of residual signals based on the plurality of output signals, wherein the plurality of residual signals are indicative of an interference between light specularly reflected from the specimen and light diffusely scattered from the specimen, and wherein the plurality of residual signals are indicative of a structural irregularity of the specimen under inspection; and determine an estimate of the structural irregularity based on the plurality of residual signals.

26. The apparatus of claim 25, wherein the spatially coherent illumination light has a degree of coherence sufficiently high to generate a detectable speckle pattern based on an interference between light specularly reflected from the specimen and light diffusely scattered from the specimen.

27. The apparatus of claim 25, wherein the instructions further comprise instructions that, when executed by the processor, cause the apparatus to:

generate a pupil image based on the plurality of output signals; and generate a residual image based on the plurality of residual signals.

28. The apparatus of claim 27, wherein the generating of the residual image involves determining a difference between the pupil image and an average of a plurality of pupil images generated over a plurality of different locations of the specimen.

29. The apparatus of claim 27, wherein the generating of the residual image involves determining a difference between the pupil image and a best fit model of the pupil image, the best fit model of the pupil image determined from a plurality of pupil images generated over a plurality of different locations of the specimen.

30. The apparatus of claim 25, wherein the determining of the estimate of the structural irregularity involves fitting a model of an average residual pattern to the plurality of residual signals.

31. The apparatus of claim 25, wherein the determining the estimate of the structural irregularity involves determining a plurality of calibrated residual signals based on measurements of a specimen with a known structural irregularity.

32. The apparatus of claim 25, wherein the determining the estimate of the structural irregularity involves determining a plurality of nominal structure parameter values each corresponding to a best fit of a model of each of a plurality of residual patterns over a plurality of different locations of the specimen and determining the estimate of the structural irregularity based at least in part on the plurality of nominal structure parameter values.

33. The apparatus of claim 27, wherein the determining an estimate of the structural irregularity involves comparing the residual image with a reference image.

34. The apparatus of claim 33, wherein the reference image is an image generated by averaging a plurality of residual images generated over a plurality of different locations of the specimen.

* * * * *